United States Patent
Yang et al.

(10) Patent No.: US 9,758,673 B2
(45) Date of Patent: Sep. 12, 2017

(54) POLYAMIDE MOLDING COMPOSITIONS, MOLDED PARTS OBTAINED THEREFROM, AND USE THEREOF

(71) Applicant: RHODIA OPERATIONS, Paris (FR)

(72) Inventors: Jun Yang, Shanghai (CN); Mok-Keun Lim, Seoul (KR); Hae-Young Kim, Seoul (KR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 15/104,506

(22) PCT Filed: Dec. 17, 2013

(86) PCT No.: PCT/CN2013/089630
§ 371 (c)(1),
(2) Date: Jun. 14, 2016

(87) PCT Pub. No.: WO2015/089720
PCT Pub. Date: Jun. 25, 2015

(65) Prior Publication Data
US 2017/0002200 A1    Jan. 5, 2017

(51) Int. Cl.
*C08L 67/02* (2006.01)
*C08L 77/00* (2006.01)
*C08L 77/06* (2006.01)
*C08L 77/02* (2006.01)
*B29C 45/00* (2006.01)
*B29K 77/00* (2006.01)
*B29L 31/34* (2006.01)

(52) U.S. Cl.
CPC .......... *C08L 77/06* (2013.01); *B29C 45/0001* (2013.01); *C08L 77/02* (2013.01); *B29K 2077/00* (2013.01); *B29L 2031/3481* (2013.01); *C08L 2203/20* (2013.01); *C08L 2205/03* (2013.01)

(58) Field of Classification Search
None
See application file for complete search history.

(56) References Cited

U.S. PATENT DOCUMENTS

2009/0170985 A1* 7/2009 Ai ........................... C08L 67/02
524/100

FOREIGN PATENT DOCUMENTS

JP    2013155279 A  *  8/2013

OTHER PUBLICATIONS

JP 2013155279A Machine Translation.*

* cited by examiner

*Primary Examiner* — Ana Woodward
(74) *Attorney, Agent, or Firm* — Osha Liang LLP

(57) ABSTRACT

Polyamide molding compositions, use thereof, and molded parts obtained therefrom Provided is a polyamide molding composition comprising a) at least one semi-crystalline polyamide; b) at least one thermoplastic polyester; c) at least one novolac resin; and d) at least one flat glass fibers as filler, and optionally e) at least one amorphous polyamide and f) at least one additive.

18 Claims, No Drawings

POLYAMIDE MOLDING COMPOSITIONS, MOLDED PARTS OBTAINED THEREFROM, AND USE THEREOF

This application is a U.S. national stage entry under 35 U.S.C. §371 of International Application No. PCT/CN2013/089630, filed Dec. 17, 2013, the entire content of which is hereby incorporated herein by reference.

FIELD OF THE INVENTION

The present invention relates to a polyamide molding composition comprising at least one semi-crystalline polyamide, at least one thermoplastic polyester, at least one novolac resin, and at least one flat glass fibers as filler, to molded parts obtained therefrom, and to use thereof The molded parts according to the present invention can be advantageously used to produce housings or housing parts of electrical and electronic apparatuses, preferably housings for mobile phone.

BACKGROUND OF THE INVENTION

A polyamide is one of the polymers which are frequently used as engineering plastics for a very wide range of applications.

A polyamide molding composition is of significant commercial interest and may be used to produce housings or housing parts of electrical and electronic apparatuses, for example housings for mobile phone, generally by injection molding.

For particular applications, such as housings or housing parts of electrical and electronic apparatuses, required is a polyamide molding composition which is capable of exhibiting properties such as light weight, high stiffness, low warpage, excellent surface quality, and minimum distortion during injection molding.

In general, polyamides have hygroscopic properties and will thus become degraded by excessive moisture during injection molding process. Further, it is well known in the field that a novolac resin can be used to reduce moisture content in a polyamide composition and thus increase dimensional stability of the articles produced using the polyamide composition. For instance, U.S. patent application publication No. 2010/0227962 A1 discloses the use of a novolac resin for increasing the rheological behavior of a polyamide composition, such polyamide composition comprising a novolac resin, and also its use for manufacturing molded parts, especially by injection molding. In this regard, however, a novolac resin has a drawback of decreasing mechanical properties of polyamide composition, e.g., tensile/flexural modulus, tensile/flexural stress, impact strength, etc. Therefore, a polyamide composition comprising a novolac resin, which can reduce moisture content while maintaining advantageous mechanical properties at a time, is a current shortfall in this technology field.

DESCRIPTION OF THE INVENTION

The present invention relates to a composition comprising:
a) at least one semi-crystalline polyamide;
b) at least one thermoplastic polyester;
c) at least one novolac resin; and
d) at least one flat glass fibers as filler.

One of the essential features of the present invention resides in using flat glass fibers instead of standard glass fibers as filler. It has also been unexpectedly found that both excellent capability of reducing moisture content as well as satisfactory mechanical properties can be attained through combined use of above recited ingredients, i.e., the thermoplastic polyester, the novolac resin and the flat glass fibers as filler, in the polyamide composition.

In addition, according to certain embodiments, it has been surprisingly found by the present inventors that use of an amorphous polyamide, e.g., such as those commercialized under tradename Selar® in addition to a novolac resin makes it possible to further increase the rheological behavior of a polyamide composition without deteriorating the mechanical properties in comparison with a polyamide composition comprising only a novolac resin.

In the present invention, the term "polyamide" is intended to denote in particular a polyamide comprising recurring units complying with any of formula (I) or formula (II) [recurring units ($R_{PA}$)]:

—NH—R$^1$—CO—                    formula (I)

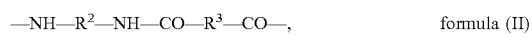

—NH—R$^2$—NH—CO—R$^3$—CO—,       formula (II)

wherein:
$R^1$, equal to or different from each other at each occurrence, is a divalent hydrocarbon group having from 1 to 17 carbon atoms;
$R^2$, equal to or different from each other at each occurrence, is a divalent hydrocarbon group having from 1 to 18 carbon atoms; and
$R^3$, equal to or different from each other at each occurrence, is a divalent hydrocarbon group having from 1 to 16 carbon atoms.

The polyamide of the inventive composition is preferably an aliphatic polyamide, that is to say that $R^1$, $R^2$ and $R^3$ are aliphatic groups.

Recurring units ($R_{PA}$) of the polyamide can be notably obtained through polycondensation reaction of (1) one of β-lactam, 5-amino-pentanoic acid, ε-caprolactam, 9-aminononanoic acid, 10-aminodecanoic acid, 11-aminoundecanoic acid, 12-aminododecanoic acid and/or (2) polycondensation reaction of at least one of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with at least one of diamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4- dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PA}$) of the polyamide are notably:

(i) —NH—$(CH_2)_5$—CO—, i.e. recurring units which can be notably obtained via polycondensation reaction of ε-caprolactam;

(ii) —NH—$(CH_2)_8$—CO—, i.e. recurring units which can be notably obtained via polycondensation reaction of 9-aminononanoic acid;

(iii) —NH—$(CH_2)_9$—CO—, i.e. recurring units which can be notably obtained via polycondensation reaction of 10-aminodecanoic acid;

(iv) —NH—$(CH_2)_{10}$—CO—, i.e. recurring units which can be notably obtained via polycondensation reaction of 11-aminoundecanoic acid;

(v) —NH—$(CH_2)_{11}$—CO—, i.e. recurring units which can be notably obtained via polycondensation reaction of laurolactam;

(vi) —NH—$(CH_2)_6$—NH—CO—$(CH_2)_4$—CO—, i.e. recurring units which can be notably obtained via polycondensation reaction of hexamethylene diamine and adipic acid;

(vii) —NH—$(CH_2)_6$—NH—CO—$(CH_2)_8$—CO—, i.e. recurring units which can be notably obtained via polycondensation reaction of hexamethylene diamine and sebacic acid;

(viii) —NH—$(CH_2)_6$—NH—CO—$(CH_2)_{10}$—CO—, i.e. recurring units which can be notably obtained via polycondensation reaction of hexamethylene diamine and dodecanoic acid;

(ix) —NH—$(CH_2)_{10}$—NH—CO—$(CH_2)_{10}$—CO—, i.e. recurring units which can be notably obtained via polycondensation reaction of decamethylene diamine and dodecanoic acid;

(x) —NH—$(CH_2)_6$—NH—CO—$(CH_2)_7$—CO—, i.e. recurring units which can be notably obtained via polycondensation reaction of hexamethylene diamine and azelaic acid (otherwise known as nonandioic acid);

(xi) —NH—$(CH_2)_{12}$—NH—CO—$(CH_2)_{10}$—CO—, i.e. recurring units which can be notably obtained via polycondensation reaction of dodecamethylene diamine and dodecanoic acid;

(xii) —NH—$(CH_2)_{10}$—NH—CO—$(CH_2)_8$—CO—, i.e. recurring units which can be notably obtained via polycondensation reaction of decamethylene diamine and sebacic acid;

(k) —NH—$(CH_2)_4$—NH—CO—$(CH_2)_4$—CO—, i.e. recurring units which can be notably obtained via polycondensation reaction of 1,4-butanediamine and adipic acid; and (kk) —NH—$(CH_2)_4$—NH—CO—$(CH_2)_8$—CO—, i.e. recurring units which can be notably obtained via polycondensation reaction of 1,4-butanediamine and sebacic acid.

Preferably, the polyamide consists essentially of recurring units ($R_{PA}$), as above detailed, being understood that end-chain, defects and other irregularities can be present in the polyamide chain, without affecting the properties thereof Recurring units ($R_{PA}$) of the polyamide can be all of the same type, or can be of more than one type, that is to say that the polyamide (PA) can be a homo-polyamide or a co-polyamide.

In the present invention, the term "semi-crystalline polyamide" is intended to denote in particular a polyamide comprising a crystallizable portion and an amorphous portion in the skeleton, i.e., an amorphous polymeric material contains randomly entangled chains and a crystalline material contains domains in which the polymer chains are packed in an ordered array, where these crystalline domains are embedded in an amorphous polymer matrix. The semi-crystalline polyamide of the present invention has a melting point greater than 150° C. and a heat of fusion greater than 5 J/g. The melting point may be measured by known method, for example, differential scanning calorimeter (DSC).

In the present invention, high flow polyamides, which have viscosity number lower than 120 ml/g measured according to ISO 307, are preferred. ISO 307 method determines viscosity number of a polyamide as a 0.005 g/ml solution in 90 wt % of formic acid at 25° C. More preferably, the viscosity number of a) at least one semi-crystalline polyamide is lower than 105 ml/g.

Specific examples of the polyamides which can be advantageously used in the hereby provided composition are notably :

polyamide 6, polyamide 6,6, polyamide 6,10, polyamide 11, polyamide 12, polyamide 6,12, and any combinations thereof.

Particularly preferred polyamide to be used in the composition of the present invention is polyamide 6,6, most preferably high flow polyamide 6,6 .

In the present invention, an amount of at least one semi-crystalline polyamide is from 25.0 to 50.0 wt % with respect to the total weight of the composition. Preferably, the amount of at least one semi-crystalline polyamide is from 30.0 wt % to 40.0 wt % with respect to the total weight of the composition.

In the present invention, the term "thermoplastic polyester" is intended to denote, in particular, a type of thermoplastic polymers which contain ester functional groups in their main chain. Examples of the thermoplastic polyester may comprise a homopolymer or copolymer obtainable by condensation of a dicarboxylic acid or its derivatives with a diol or its derivatives, or mixtures thereof.

Examples of dicarboxylic acids may comprise, but are not limited to, aromatic dicarboxylic acids such as terephthalic acid, isophthalic acid, phthalic acid, 1,4-, 1,5-, 2,6- or 2,7-naphthalene dicarboxylic acid, bis(p-carboxyphenyl) methane, anthracene dicarboxylic acid, diphenyl ether 4,4'-dicarboxylic acid, sodium 5-sulfoisophthalic acid, etc.; aliphatic dicarboxylic acids such as adipic acid, sebacic acid, azelaic acid, dodecanedioic acid, etc.; cycloaliphatic dicarboxylic acids such as 1,3-cyclohexane dicarboxylic aicd, 1,4-cyclohexane dicarboxylic acid, etc.; and derivatives thereof. In a certain embodiment, said derivatives may be substituted by alkyl, alkoxy or halogen group.

In addition, examples of diols may comprise, but are not limited to, aliphatic glycol having 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, etc.; glycol with long chain having molecular weight of 400 to 6000 such as polyethylene glycol, poly-1,3-propylene glycol, polytetramethylene glycol, etc.; and derivatives thereof. In a certain embodiment, said derivatives may be substituted by alkyl, alkoxy or halogen group.

Examples of the thermoplastic polyester suitable for being used in the composition of the present invention comprise, but are not limited to, polybutylene terephthalate (PBT), polybutylene terephthalate/isophthalate copolymer, polybutylene terephthalate/adipate copolymer, polybutylene terephthalate/sebacate copolymer, polybutylene terephthalate/decanedicarboxylate copolymer, polybutylene naphthalate, polyethylene terephthalate (PET), polyethylene terephthalate/isophthalate copolymer, polyethylene terephthalate/adipate copolymer, polyethylene terephthalate/sodium 5-sulfoisophthalate copolymer, polybutylene terephthalate/sodium 5-sulfoisophthalate copolymer, polypropylene terephthalate, polyethylene naphthalate, polycyclohexanedimethylene terephthalate, and the like. PBT may be prepared through polycondensation of terephthalic acid with 1,4-butanediol, and PET through polycondensation of terephthalic acid with ethylene glycol, etc.

In addition to the above-mentioned thermoplastic polyesters, examples of the thermoplastic polyester suitable for being used in the composition of the present invention comprise, but are not limited to, polyesters copolymerized with a copolymerizable monomer, for example, hydroxycarboxylic acid such as glycolic acid, hydroxybezoic acid, hydroxyphenylacetic acid, naphthylglycolic acid, etc.; and lactones such as propiolactone, butyrolactone, caprolactone, valerolactone, etc.

In one embodiment of the present invention, the thermoplastic polyester is PET.

In the present invention, an amount of at least one thermoplastic polyester is from 5.0 to 12.0 wt % with respect to the total weight of the composition. Preferably, the amount of at least one thermoplastic polyester is from 8.0 to 10.0 wt % with respect to the total weight of the composition.

The term "novolac resin" of the present invention is intended to denote in particular a compound of polyhydroxyphenol type, for example product of condensation of a phenolic compound with an aldehyde or a ketone with a molar ratio of aldehyde to phenol of less than one. The condensation reaction is usually catalyzed with an acid, and as phenolic resins, mention may be made of phenol, cresol, xylenol, naphthol, alkylphenols such as butylphenol, tert-butylphenol, isooctylphenol, nitrophenol, phenylphenol, resorcinol or biphenol A, or any other substituted phenol. The aldehyde most frequently used is formaldehyde, but other aldehydes such as acetaldehyde, para-formaldehyde, butyraldehyde, crotonaldehyde, glyoxal or furfural may be used as well. In addition, acetone, methyl ethyl ketone or acetophenone may be used as a ketone.

The composition of the present invention may comprise one or more types of novolac resins.

In a specific embodiment of the present invention, the novolac resin is a product of condensation of phenol and formaldehyde.

The generic structure of a novolac resin may be represented as follows:

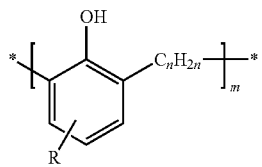

wherein
R may be a hydrogen atom or a hydrocarbon-based group,
n is between 1 and 3, and
m is between 2 and 15, preferably between 2 and 10.

The novolac resins, which can be advantageously used, have molecular weight of between 500 and 3000, preferably between 800 and 2000.

Commercail novolac resins which may be mentioned, include Durez®, Vulkadu® and Rhenosin®.

In the present invention, an amount of at least one novolac resin is from 1.0 to 4.0 wt % with respect to the total weight of the composition. Preferably, the amount of at least one novolac resin is from 2.0 to 2.5 wt % with respect to the total weight of the composition.

The composition according to the present invention comprises d) at least one flat glass fibers as filler.

In the present invention, the term "flat glass fibers" is intended to denote in particular glass fibers having a non-circular cross section. Flat glass fibers suitable for being used as filler in the composition of the present invention may have any non-circular cross section such as an elliptical section, oblong-circular section, rectangle section, a section in which half rounds are connected to both short sides of a rectangle, and cocoon section.

The aspect ratio (=major axis/minor axis) of said non-circular cross section of the flat glass fibers is advantageously from 1.5 to 10, preferably from 2.0 to 6.0.

The aspect ratio described at the present specification can be determined by analyzing an image obtained by observing a cross section of the flat glass fiber with a scanning electron microscope (SEM), and circumscribing the non-circular section of the flat glass fiber with a rectangle. The aspect ratio is obtained by calculating A (=length of $R_a$)/B (=length of $R_b$) wherein A and B are the length of a long side $R_a$ and a short side $R_b$ of a rectangle circumscribed to the flat glass fiber in the observed image.

Nature of glasses constituting the flat glass fibers of the composition of the present invention is not particularly limited and can include E glass, T glass, NE glass, C glass, S glass, S2 glass and R glass, and the like.

In the present invention, an amount of at least one flat glass fibers as filler is from 15.0 to 55.0 wt % with respect to the total weight of the composition. Preferably, the amount of at least one flat glass fibers as filler is from 40.0 to 50.0 wt % with respect to the total weight of the composition.

In addition, the composition according to the present invention may optionally comprise e) at least one amorphous polyamide.

In the present invention, the term "amorphous polyamide" is intended to denote in particular a polyamide, which has a heat of fusion of less than 5 J/g, preferably 0 J/g, i.e., no detectable melting point, and exhibits superior transparency and good barrier properties to gases such as $O_2$ and $CO_2$, water, solvents, etc. The amorphous polyamide retards the rate of crystallization and thus results in a superior surface appearance. Polyamide 6I/6T, which may be prepared by copolymerization of 1,6-hexamethylene diamine, isophthalic acid and terephthalic acid, is most advantageously used in the composition of the present invention. Selar® polyamide 6I/6T may be mentioned as a suitable commercial amorphous polyamide, which can be used in the composition of the present invention.

In the present invention, an amount of at least one amorphous polyamide may be from 0 to 4.0 wt %, preferably 0 to 3.0 wt % with respect to the total weight of the composition. The range of concentration by weight of the amorphous polyamide, if contained in the composition of the present invention, may be from 1.0 to 4.0 wt %, preferably from 1.0 to 3.0 wt % with respect to the total weight of the composition.

Further, the composition according to the present invention may optionally comprise f) at least one additive. Examples of the additives, which may be advantageously used, include a colorant, a lubricant, a light and/or heat stabiliser, a flame retardant, a plasticizer, a nucleating agent, a catalyst, an antioxidant, an antistatic agent, a pigment, and any combination thereof.

In the present invention, an amount of at least one additive may be from 0 to 4.0 wt %, preferably 0 to 2.0 wt % with respect to the total weight of the composition. The range of concentration by weight of the additive, if contained in the composition of the present invention, may be from 1.0 to 4.0 wt %, preferably from 1.5 to 2.0 wt % with respect to the total weight of the composition.

In a preferred embodiment of the present invention, the composition comprises:
a) at least one semi-crystalline polyamide 35.0 to 50.0 wt %;
b) at least one thermoplastic polyester 9.0 to 10.0 wt %;
c) at least one novolac resin 2.0 to 3.0 wt %;
d) at least one flat glass fibers as filler 37 to 50.0 wt %;
e) at least one amorphous polyamide 1.0 to 3.0 wt %; and
f) at least one additive 0.5 to 2.0 wt %,
wherein the total amount of a)-f) is 100 wt % of the composition.

For the preparation of a polyamide composition, these additives and flat glass fibers may be added to the polyamide via conventional means suitable for flat glass fibers and additives, for example during the polymerization or as a molten mixture. The novolac resin is preferably added to the polyamide as a melt, or as a solid in a mechanical mixer and then the solid mixture may be melted.

Another aspect of the present invention relates to molded parts produced by injection molding of the present composition.

Further aspect of the present invention relates to a use of the molded parts to produce housings or housing parts of electrical and electronic apparatuses, preferably housings for mobile phone.

The composition according to the invention may be used as a raw material, for example for the preparation of articles by injection molding, by injection/blow molding, by extrusion or by extrusion/blow molding, preferably by injection molding. According to an embodiment, the polyamide composition is extruded in the form of rods, for example in a twin-screw extruder, and then chopped into granules. The molded parts are then prepared by melting said granules and feeding the molten composition into injection molding devices.

Other details or advantages of the present invention will become more clearly apparent through the examples given below. The present invention will be elucidated by the following examples, which are intended to demonstrate, but not to restrict, the invention.

EXAMPLES

Chemical reagents used in the Examples are specified as follows:
Polyamide 66: STABAMID® 26FE1 K PA66 available from Solvay Polyamide & Intermediates;
PET: Bright Fiber Grade Polyester Chips available from Shanghai Hengyi Polyester Fiber Co., Ltd.;
Standard Glass Fiber: ECSO® 3T-289H glass fibers from Nippon Electric Glass Co., Ltd.;
Flat Glass Fiber: ECS301T having aspect ratio of 3:1 available from Chongqing Polycomp International Corp.;
Novolac: Durez® 28391-P available from Sumitomo Bakelite Europe N.V.;
Amorphous polyamide: commercially available under trade name Selar® from E.I. Dupont;
Colorant: MB BLACK 7040N available from RS Chemical;
Lubricant: EBS TRS2 available from Lion Chemtech; and
Heat stabilizer: MB HS30E available from RS Chemical.

The polyamide compositions were obtained by i) feeding all the components indicated in Table 1 below except glass fiber through main feeder after pre-mixing and glass fiber through a side feeder of a twin-screw extruder of W&P ZSK18, available from MEGA1ab, ii) mixing all the components in the extruder and iii) subsequently extruding the mixture. The extrusion temperatures were 280-280-280-270-270-242-200° C. from nozzle to hopper, and the throughput and RPM were 10 kg/hr and 600, respectively. The extrudates were then cooled in water at room temperature.

The compositions prepared Ex. 1 to Ex. 4 are detailed in Table 1 below.

The proportions are indicated in weight percentages in the composition.

TABLE 1

| Component (in wt %) | Ex. 1 | Ex. 2 | Ex. 3 | Ex. 4 |
|---|---|---|---|---|
| Polyamide 66 | 38.7 | 38.7 | 36.3 | 45.4 |
| PET | 9.7 | 9.7 | 9.1 | — |
| Standard Glass Fiber | 50.0 | — | — | — |
| Flat Glass Fiber | — | 50.0 | 50.0 | 50.0 |
| Novolac | — | — | 2.0 | 2.0 |
| Amorphous polyamide | — | — | 1.0 | 1.0 |
| Colorant | 1.0 | 1.0 | 1.0 | 1.0 |
| Lubricant | 0.3 | 0.3 | 0.3 | 0.3 |
| Heat Stabilizer | 0.3 | 0.3 | 0.3 | 0.3 |
| Total | 100 | 100 | 100 | 100 |

The mechanical properties of these compositions were measured before conditioning, i.e., under "dry as molded (d.a.m.)" condition and also after conditioning. The results were summarized in Table 2 and Table 3 below, e.g., the moisture content, and mechanical properties such as the tensile modulus (TM), the tensile strength (TS) at break, and the flexural modulus (FM).

The conditioning was implemented in 23° C. of water for 23 days. FM was measured according to ISO 178, and TM and TS at break according to ISO 527.

TABLE 2

| | Ex. 1 | Ex. 2 | Ex. 3 | Ex. 4 |
|---|---|---|---|---|
| | (d.a.m) | | | |
| TM (MPa) | 17,483 | 16,966 | 17,357 | 17,244 |
| TS at break (MPa) | 255.81 | 254.22 | 258.14 | 260.54 |
| FM (MPa) | 16,747 | 16,452 | 16,433 | 16,120 |

TABLE 3

| | Ex. 1 | Ex. 2 | Ex. 3 | Ex. 4 |
|---|---|---|---|---|
| | (after conditioning) | | | |
| Moisture content (%) | 1.32 | 1.24 | 0.88 | 1.03 |
| TM (MPa) | 14,764 | 14,602 | 15,760 | 15,237 |
| TS at break (MPa) | 194.68 | 195.36 | 218.53 | 214.82 |
| FM (MPa) | 12,165 | 12,154 | 12,992 | 12,047 |

As being confirmed from the experimental data in Table 3, the moisture content of Ex. 3 was noticeably low compared to those of Ex. 1 and Ex. 2 . It was also observed that the combined use of novolac resin and flat glass fiber as in Ex. 3 resulted in high preservation of the mechanical properties after conditioning in comparison with Ex. 1 and Ex. 2 . In particular, TS at break after conditioning for Ex. 3 decreased only about 15.3%, whereas about 23.9% and about 23.2% decrease was observed for Ex. 1 and Ex. 2, respectively.

In addition, it was also found that the composition Ex. 4, which did not even comprise PET while including flat glass fiber, novolac and Selar®, showed relatively low moisture content and good mechanical properties after conditioning.

The invention claimed is:

1. A composition comprising:
   a) at least one semi-crystalline polyamide in an amount of 25.0 to 50.0 wt % with respect to the total weight of the composition;
   b) at least one thermoplastic polyester in an amount of 5.0 to 12.0 wt % with respect to the total weight of the composition;
   c) at least one novolac resin; and
   d) at least one flat glass fiber as a filler.

2. The composition according to claim 1, wherein the semi-crystalline polyamide is high flow polyamide having viscosity number lower than 120 ml/g.

3. The composition of claim 2, wherein the viscosity number of the semi-crystalline polyamide is lower than 105 ml/g.

4. The composition according to claim 1, wherein the semi-crystalline polyamide is selected from the group consisting of polyamide 6, polyamide 6,6, polyamide 6,10, polyamide 11, polyamide 12, polyamide 6,12, and any combinations thereof.

5. The composition according to claim 4, wherein the semi-crystalline polyamide comprises-polyamide 6,6.

6. The composition according to claim 4, wherein the thermoplastic polyester comprises polyethylene terephthalate.

7. The composition according to claim 1, wherein the thermoplastic polyester is selected from the group consisting of polybutylene terephthalate, polyethylene terephthalate, polybutylene adipate, polyethylene succinate, polybutylene succinate, polyethylene sebacate, polybutylene sebacate and any combinations thereof.

8. The composition according to claim 1, wherein the novolac resin is prepared by condensation of a phenolic compound with an aldehyde with a molar ratio of aldehyde to phenol of less than one.

9. The composition according to claim 1, further comprising:
   e) an amorphous polyamide.

10. The composition according to claim 9, wherein the amorphous polyamide is present in an amount of 1.0 to 4.0 wt % with respect to the total weight of the composition.

11. The composition according to claim 1, further comprising:
    f) at least one additive selected from the group consisting of a colorant, a lubricant, a light and/or heat stabilizer, a flame retardant, a plasticizer, a nucleating agent, a catalyst, an antioxidant, an antistatic agent, a pigment.

12. The composition according to claim 1, comprising c) the novolac resin in an amount of 1.0 to 4.0 wt % with respect to the total weight of the composition.

13. The composition according to claim 1, comprising d) the flat glass fiber in an amount of 15.0 to 55.0 wt % with respect to the total weight of the composition.

14. A molded part produced by injection molding of the composition according to claim 1.

15. A housing or a part of a housing of an electrical or electronic device comprising a molded part according to claim 14.

16. A process for making a housing or a part of a housing of an electrical or electronic device, comprising injection molding a composition according to claim 1.

17. The composition according to claim 1, wherein the composition comprises the semi-crystalline polyamide in an amount of 30.0 to 40.0 wt % with respect to the total weight of the composition.

18. The composition according to claim 1, wherein the composition comprises the thermoplastic polyester in an amount of 8.0 to 10.0 wt % with respect to the total weight of the composition.

* * * * *